(12) United States Patent
Dauner et al.

(10) Patent No.: US 6,526,460 B1
(45) Date of Patent: Feb. 25, 2003

(54) VEHICLE COMMUNICATIONS SYSTEM

(75) Inventors: Oskar Dauner, Esslingen (DE); Fridjof Goebel, Heilbronn (DE); Jutta Schneider, Erlangen (DE); Sandra Schneider, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,364

(22) Filed: Aug. 30, 1999

(30) Foreign Application Priority Data

Aug. 28, 1998 (DE) .......................................... 198 39 354

(51) Int. Cl.⁷ .............................................. G06F 13/38
(52) U.S. Cl. ............................ 710/65; 710/18; 710/62; 710/64; 709/246; 712/225; 701/48
(58) Field of Search ................................ 710/65, 1, 62, 710/63, 64, 72–74, 8, 15, 17, 126, 129, 7, 18, 36, 101; 712/225; 709/246, 48

(56) References Cited

U.S. PATENT DOCUMENTS

| | | | |
|---|---|---|---|
| 4,942,571 A | | 7/1990 | Möller et al. ............... 370/85.1 |
| 5,251,211 A | * | 10/1993 | Mutoh et al. ............... 370/85.1 |
| 5,565,856 A | * | 10/1996 | Takaba et al. ......... 340/825.16 |
| 5,617,282 A | * | 4/1997 | Rall et al. ...................... 361/56 |
| 5,978,593 A | * | 11/1999 | Sexton ........................... 710/1 |
| 6,023,232 A | * | 2/2000 | Eitzenberger ............... 340/988 |
| 6,067,302 A | * | 5/2000 | Tozuka ........................ 370/464 |
| 6,185,484 B1 | * | 2/2001 | Rhinehart ....................... 701/1 |
| 6,256,557 B1 | * | 7/2001 | Avila et al. .................... 701/1 |
| 6,360,152 B1 | * | 3/2002 | Ishibashi et al. .............. 701/48 |

FOREIGN PATENT DOCUMENTS

| | | |
|---|---|---|
| DE | 692 09 364 | 5/1992 |
| DE | 42 18 804 | 12/1993 |
| DE | 196 25 002 | 1/1998 |

OTHER PUBLICATIONS

Karl Joachim Neumann, Uwe Kiencke and Ansgar Maisch, "Ein aufkommender Standard fur verteilte System im Kfz", Automatisierungstechnische Praxis 40, 1998, pp. 22–31.

* cited by examiner

Primary Examiner—Jeffrey Gaffin
Assistant Examiner—Rijue Mai
(74) Attorney, Agent, or Firm—Crowell & Moring LLP

(57) ABSTRACT

A vehicle communications system, in particular for a motor vehicle, is provided having a plurality of equipment units for transmitting, receiving, acquiring and/or processing data for executing applications. The equipment units are connected to a common data bus via associated hardware interfaces. The applications are assigned flexibly controllable functions, each function being respectively assigned a software interface for exchanging data with other software interfaces and/or hardware interfaces, and the functions being executed within any desired equipment unit.

8 Claims, 2 Drawing Sheets

VEHICLE COMMUNICATIONS SYSTEM

BACKGROUND AND SUMMARY OF THE INVENTION

This application claims the priority of German Application No. 198 39 354.7, filed Aug. 28, 1998, the disclosure of which is expressly incorporated by reference herein.

The invention relates to a vehicle communications system in particular for a motor vehicle, having a plurality of equipment units for transmitting, receiving, acquiring and/or processing data for executing applications, the equipment units being connected to a common data bus by means of associated hardware interfaces.

Networked systems with hardware and software components, which can encompass different functions, are already used in vehicles. In order to control these functions, a central computer unit is used. The central computer unit is provided with the necessary intelligence and control programs and also with corresponding hardware interfaces and thus constitutes the center of these communications systems. The communications systems are fixated on the central computer unit, which monitors all of the communication functions and enables the execution of programs, for example the execution of telematic services such as automatic emergency call, dynamic navigation, etc.

Thus, German Patent document DE 196 25 002 A1 discloses a generic vehicle communications system having a central computer for performing telematic applications such as fleet management, route planning, remote diagnosis, anti-theft protection, etc., having equipment units for transmitting, receiving and/or processing data associated with the telematic applications, and having one or more data transmission channels with associated hardware interfaces via which the equipment units can be connected to the central vehicle computer. The equipment units are assigned to the various telematic applications in a flexibly controllable manner. In order to perform the telematic applications, an adaptive application controller selects the respectively required equipment units in an application-specific manner and controls the required data transmission processes and undertakes resource, operational and priority management.

This communication system could be regarded as having the disadvantages wherein a modular system structure can only be realized by means of corresponding or different hardware interfaces at the central computer and that, in the case of equipment units with a plurality of executable functions in the hardware interface, a complicated protocol has to be performed by the central computer.

German Patent document DE 42 18 804 A1 discloses a device for displaying, conditioning and storing information in a motor vehicle having a central computer, a mass storage device for the non-volatile storage of programs and data, hardware interfaces for receiving information, an operational unit, a display unit and an operating system which allows the execution of further programs adapted to the respective application.

This system may be regarded as having the disadvantage that the individual functions cannot be operated from all operational locations. Moreover, there is no description of how the system can be extended and of how functional changes can be performed.

The object of the invention is to develop a generic communications system such that it can be extended and adapted to new tasks and applications with comparatively little outlay.

This object is achieved according to the invention by means of a vehicle communication system in particular for a motor vehicle, having a plurality of equipment units for transmitting, receiving, acquiring and/or processing data for executing applications, the equipment units being connected to a common data bus by means of associated hardware interfaces. The applications are assigned flexibly controllable functions, each function being respectively assigned a software interface for exchanging data with other software interfaces and/or hardware interfaces, and the functions being executed within any desired equipment units.

Advantageous designs and/or developments are further described herein.

The principal concept of the invention consists in assigning flexibly controllable functions to the applications, each function being respectively assigned a software interface for exchanging data with other software interfaces and/or hardware interfaces. The functions are executed within any desired equipment units. The execution of an individual function, however, is always effected within a single equipment unit and is not distributed between a plurality of equipment units. In other words, when an application is executed, it is not the various equipment units that are addressed but rather the functions which are required for executing the application and which may be distributed as desired between the equipment units present within the communications system in the vehicle. It is possible for the distribution of the functions between the various equipment units to be changed at any time in a simple manner. An executable function in the sense of the invention can be realized within an equipment unit in terms of hardware, for example by means of an electronic circuit, and/or in terms of software, for example as a program running on a processor.

The task of the software interfaces assigned to the functions consists in converting the data from other software interfaces and/or the hardware interface into input parameters for the function to be addressed and/or the output parameters of the addressed function into data for the other software interfaces and/or the hardware interface. The hardware interface performs the adaptation of the internal data of the equipment units to the data format of the common data bus used, and vice versa. It is possible for the common data bus also to encompass a plurality of connected data buses having the same protocol in any desired topology (for example ring, dual ring or star).

By virtue of the invention providing for the introduction of additional software interfaces, the hardware interfaces can be constructed uniformly. As a result, a uniform transmission protocol can be performed for the common data bus. The equipment units are in each case provided only with one hardware interface to the common data bus, which acts as a gateway between the respective equipment unit and the common data bus. If an optical data bus is used, the hardware interface undertakes, by way of example, the conversion of optical signals into electrical signals and, moreover, specific additional tasks such as the performance of a transmission protocol. The main work is done by the software interfaces, which can be programmed in a manner dependent on the functions assigned to them. If, by way of example, five functions are executed within an equipment unit, then the equipment unit is provided with one hardware interface and five software interfaces.

The assignment of, in each case, one software interface to in each case one executable function advantageously achieves modularity at the functional level. The various executable functions can be arranged via the software interfaces in any desired equipment units, and consequently at any desired location within the communications system, and be utilized by all of the system subscribers. If the functionality of an equipment unit is changed by means of software and/or hardware measures, then the hardware interface of the corresponding equipment unit remains unchanged; only the software interfaces have to be adapted to the new functional scope. The software interfaces can be realized as a dedicated program stored in read-only memory modules or, if the function itself is realized as software, as a subroutine of this software. Consequently, the communications system can be extended as desired, since all the functions, irrespective of whether they are realized by means of hardware or by means of programs, can be installed subsequently and can be spatially arranged as desired in the vehicle. Likewise, the equipment units can be interchanged or replaced by new equipment units having a greater functional scope (for example new display generation, a memory extension, etc.). In this case, the software interfaces are constructed transparently, that is to say all the input parameters and/or output parameters of the functions and also the data supplied and/or required by the hardware interface are known.

According to the invention, the structure of the communications system advantageously makes it possible for the different applications to be operated from all of the equipment units embodied as operational locations (human-machine interface), it being possible for the various operational locations to be equipped differently, for example with a large or small display, different keypads, etc. Furthermore, the number of operational locations is also not fixed; it is possible to provide a plurality of operational locations which are equipped identically and/or differently.

Simultaneous access to a source by more than one operational location can be regulated only with the aid of priority management. The priority management controls which operational location has priority in the event of access to the source, but it can also prohibit an operational location from accessing a source or permit it only to monitor a source that is already busy. All variations are contemplated here. The priority management also regulates the priority of the presentation of applications at an operational location, that is to say which application is currently displayed; thus, by way of example, a telephone call can be displayed immediately. In addition, it is contemplated for a specific operational location to be embodied as a superuser, that is to say this operational location is given the highest priority and thus always has access to all of the sources. In this case, the priority management is freely configurable and can, for example, be configured by the user or a specific service department.

By virtue of the functional modularity already described, the tasks can advantageously be distributed in the system. System tasks such as, for example, the priority management, resource management for managing source-sink relationships and for reporting overload states to the priority management, or operational management for generating commands and data streams on the basis of user actions, as well as the presentation of functions do not have to be stored in a single equipment unit, such as, for example, in an equipment unit embodied as a PC or main computer, but rather can be accommodated in any other equipment units, for example in the operational locations. Moreover, all functions in the communications system are available for all applications. Thus, by way of example, the position-finding signal can be utilized not only for the 'route calculation' application but also for the 'anti-theft protection' application.

By virtue of the described structure of the communications system according to the invention, it is possible for changed or additional functions in the form of programs and/or equipment units to be integrated into the communications system at any time subsequently by the customer and/or by a suitable service department. This also applies, for example, to new telematic services. Moreover, subsequent memory extension or a change to the operating system is possible at any time.

A further advantage afforded by the communications system according to the invention is that a security and/or firewall concept can be realized in a distributed and multi-level manner, in which case, by way of example, specific security functions (filters) are accommodated in every equipment unit embodied as a gateway to other bus systems or in every other equipment unit present in the communications system from which the communications system can be accessed.

In addition, all of the executable functions may be present in the system in any desired number within the framework of the physical boundary conditions; by way of example, it is possible to provide a plurality of CD players for the use of audio CDs and/or CD-ROMs.

A further advantage afforded by the communications system described is that the development of new communication and/or telematic functions can be decoupled from vehicle development, since it is necessary only to provide space for the common data bus and for a plurality of equipment units in the vehicle.

The multi-station capability makes it possible, moreover, to simultaneously enable different optical and/or acoustic presentations of an application at the operational locations. Thus, the output in the case of automatic navigation by the display unit of the driver's operational location consists for example of a symbolic arrow presentation with an additional voice output, whereas the display unit at the passenger's operational location presents an overview map.

Other objects, advantages and novel features of the present invention will become apparent from the following detailed description of the invention when considered in conjunction with the accompanying drawings.

DETAILED DESCRIPTION OF THE DRAWINGS

Figure 1:
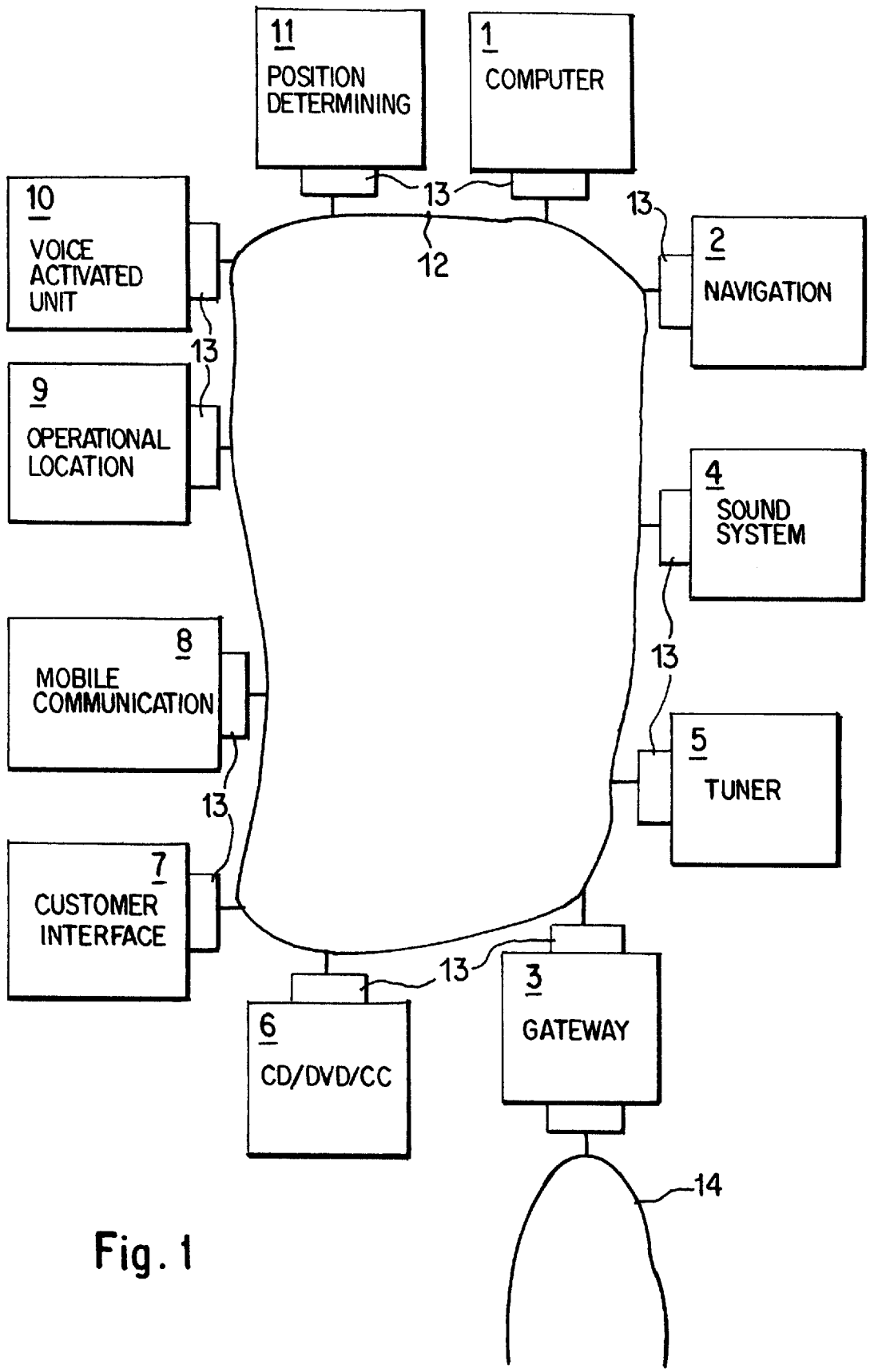
FIG. 1 is a schematic overview of the essential components of a vehicle communications system according to the invention.

As is evident from FIG. 1, the vehicle communications system comprises a computer equipment unit 1 with a freely available memory and a standard operating system, a navigation equipment unit 2, an equipment unit embodied as a gateway 3 and serving the purpose of linking to other vehicle bus systems 14, for example to the CAN bus, an equipment unit sound system 4, which serves for driving loudspeaker systems for providing sound in a location-specific manner, for suppressing noise and for mixing and distorting signals, and a tuner 5 or other sources for receiving radio/television signals as well as other audio and/or video information. The vehicle communication system also comprises a further equipment unit 6, which is embodied as a CD player (compact disc) and/or DVD (digital versatile disc) and/or CC (compact cassette) and is required for conditioning audio and/or video signals from data carriers, and an equipment unit embodied as a customer interface 7 and serving to connect PDAs, fax, printer, games, video, headphones, microphone, etc., it being possible to provide various interfaces such as, for example, an infrared interface, a serial interface, a PC card interface. The system further comprises an equipment unit for mobile communication 8, for which all the different standards such as, for example, GSM, AMPS, Docomo, etc., are contemplated, a plurality of operational locations, of which, by way of example, an operational location 9 is illustrated, with optical and/or acoustic display units, input units, for example keypads, operational devices on the steering wheel, pointing devices such as computer mice, trackballs, etc., touchpad, touchscreen, keys and any other input and output possibilities that can be imagined, such as microphones and headphones, an equipment unit embodied as a voice-activated operational system 10 and serving for voice input and voice output, as well as for voice recording and for voice control of vehicle functions, a position-finding equipment unit 11, which determines the position data and makes it available having conditioned it as desired. The position-finding equipment unit 11 comprises not only a GPS receiver, but also further sensor devices for position-finding, for example a gyro. The said equipment units (1–11) are connected to a common data bus 12 via a respective hardware interface 13 of uniform construction.

The communications system is used for the execution of applications, functions and services, an application producing an achievement from which a user benefits directly.

In this case, an application comprises at least one function which enables the achievement to be produced for the user. However, an application can also be constructed hierarchically from a plurality of sub-applications which, in turn, comprise at least one function.

A function produces an achievement which is part of a whole, for example of an application, an individual function being executed within a single equipment unit. Most of the functions are not directly visible to the customer.

A service is a special application whose individual functions are executed not only in equipment units within the vehicle but also in equipment units which are situated outside the vehicle and are part of a service center, for example.

Figure 2:
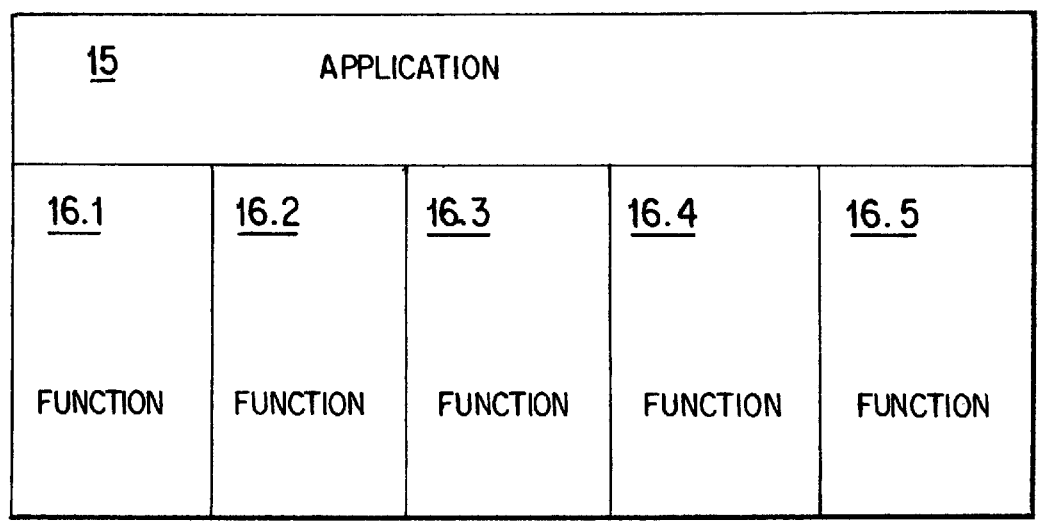
FIG. 2 is a schematic illustration of an application according to the invention.
Figure 3:
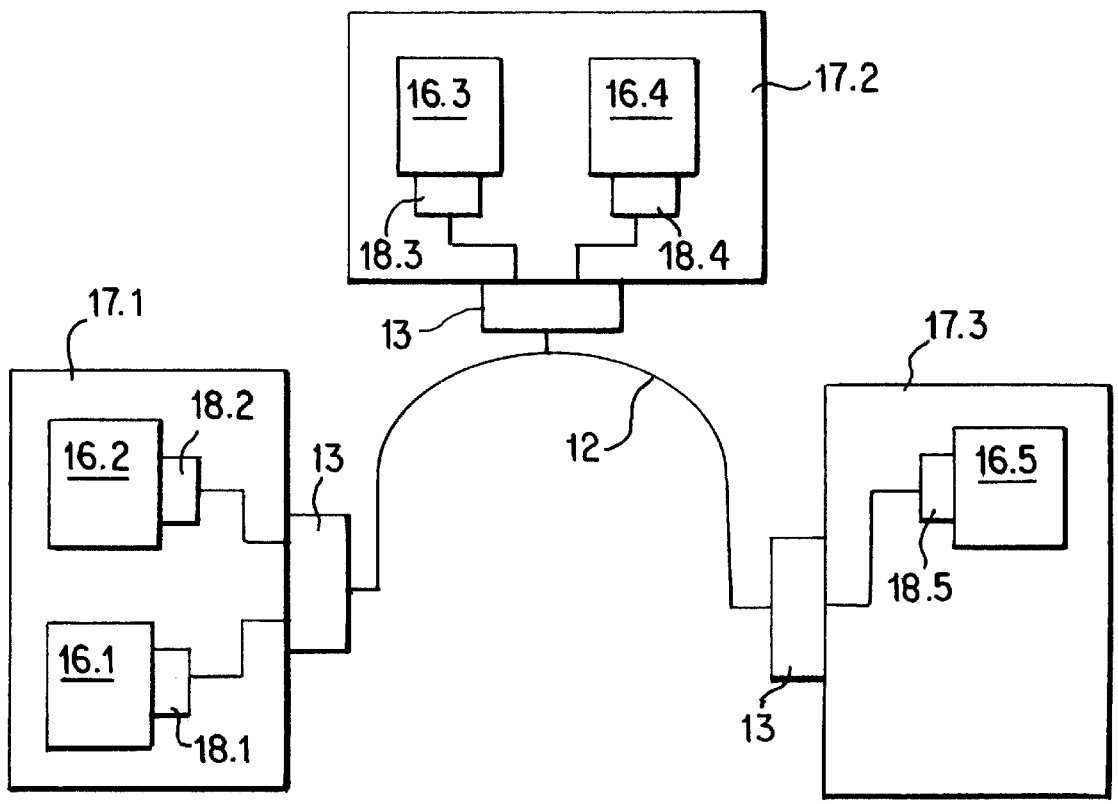
FIG. 3 is a schematic illustration of an application which is distributed between the vehicle communications system according to the invention.

As is evident from FIG. 2, an application 15, which is illustrated by way of example and relates for example to the operation of an audio system, of a telephone, of an air-conditioning system, of a navigation system, etc., comprises a plurality of functions 16.1 to 16.5, the functions 16.1 to 16.5, as is evident from FIG. 3, being executed within different equipment units 17.1, 17.2, 17.3. The equipment units 17.1, 17.2, 17.3 are connected to a common data bus 12 via a respective hardware interface 13. The data of the hardware interfaces 13 are converted by software interfaces 18.1 to 18.5 into input parameters for the function 16.1 to 16.5 assigned to the respective software interface 18.1 to 18.5. The output parameters of the corresponding function 16.1 to 16.5 are converted by the software interface 18.1 to 18.5 assigned to the respective function 16.1 to 16.5 into data for the other software interfaces 18.1 to 18.5 and/or the hardware interfaces 13. The illustrated way in which the functions 16.1 to 16.5 have been divided between the equipment units 17.1 to 17.3 should be regarded as an example. It is also contemplated for all the functions 16.1 to 16.4 of the application 15 to be performed within a single one of the equipment units 17.1 to 17.3 illustrated; any other variants for dividing the functions 16.1 to 16.5 between the equipment units 17.1 to 17.3 are equally possible. Examples of further possible applications are all PC applications such as word processing, appointments diary, notebook, journey log, games, address book, navigation, and also services via external control centers, such as dynamic navigation, directory inquiry services, information services, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle communications system, comprising:

a plurality of equipment units for transmitting, receiving, acquiring and/or processing data for executing applications;

a plurality of hardware interfaces each associated with one of said plurality of equipment units;

a common vehicle data bus, each of the plurality of equipment units being connected to the common vehicle data bus via said associated one of said hardware interfaces; and wherein the applications are assigned flexibly controllable functions having respective software interfaces, each function being respectively assigned one of said software interfaces for exchanging data with other ones of software interfaces and/or said hardware interfaces, wherein the functions are executed within any desired one of said equipment units.

2. The vehicle communications system according to claim 1, wherein the software interface assigned to the function converts data from other ones of said software interfaces and/or the hardware interfaces into input parameters for the function and/or output parameters of the function into data for the other software interfaces and/or the hardware interfaces.

3. The vehicle communications system according to claim 1, wherein the executable functions are realized in at least one of hardware and software.

4. The vehicle communications system according to claim 1, wherein a plurality of software interfaces are provided within one of said plurality of equipment units, the number of software interfaces being dependent on the number of functions executable within the one equipment unit.

5. The vehicle communications system according to claim 1, wherein a specific function is provided a number of times within a specific one of said equipment units and/or within different ones of said equipment units.

6. The vehicle communications system according to claim 2, wherein all the input parameters and/or output parameters of the functions and the data supplied and/or required by the hardware interfaces are known.

7. A method for operating a vehicle communications system having a plurality of equipment units for transmitting, receiving, acquiring and/or processing data for executing applications, the equipment units being coupled to a common data bus via associated hardware interfaces, the method comprising the acts of:

assigning flexibly controllable functions to the applications;

assigning a software interface to each function for exchanging data with other software interfaces and/or said associated hardware interfaces; and executing the functions within any one of the plurality of equipment units.

8. The method according to claim 7, wherein the software interface assigned to a function operates to convert data from the other software interfaces and/or the associated hardware interfaces into input parameters for the function and/or output parameters of the function into data for the other software interfaces and/or the hardware interfaces.

* * * * *